A. MEISSNER.
PROCESS AND APPARATUS FOR DETERMINING THE POSITION OF RADIOTELEGRAPHIC RECEIVERS.
APPLICATION FILED AUG. 2, 1912.
1,135,604.
Patented Apr. 13, 1915.
2 SHEETS—SHEET 1.
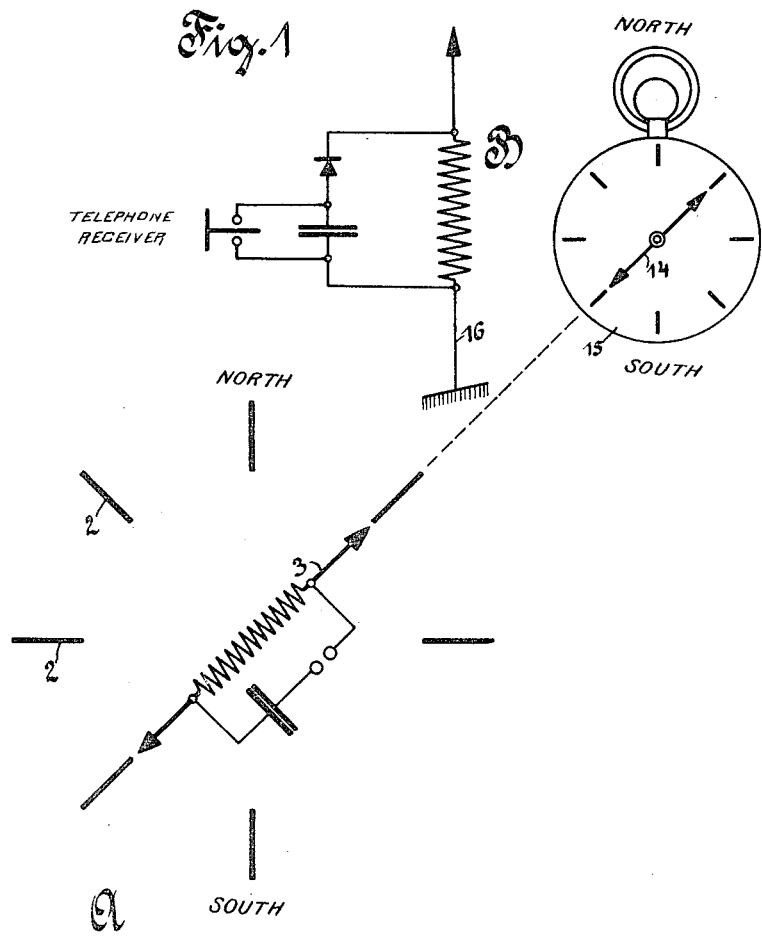

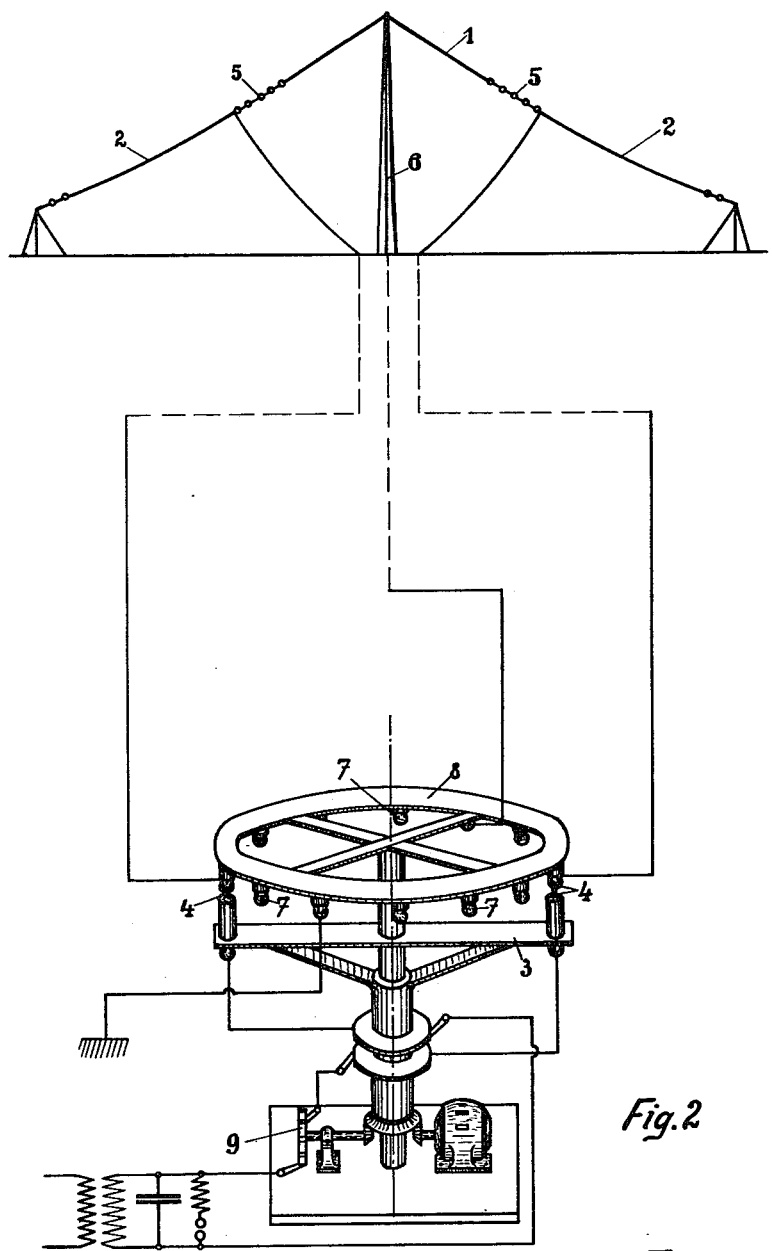

UNITED STATES PATENT OFFICE.

ALEXANDER MEISSNER, OF BERLIN, GERMANY.

PROCESS AND APPARATUS FOR DETERMINING THE POSITION OF RADIOTELEGRAPHIC RECEIVERS.

1,135,604.     Specification of Letters Patent.     Patented Apr. 13, 1915.

Application filed August 2, 1912. Serial No. 712,913.

*To all whom it may concern:*

Be it known that I, ALEXANDER MEISSNER, a citizen of the Empire of Austria-Hungary, and residing at Berlin, Germany, have invented a certain new and Improved Process and Apparatus for Determining the Position of Radiotelegraphic Receivers, of which the following is a specification.

My invention relates to means for determining at wireless telegraphy stations, the direction from which signals arrive.

In apparatus known heretofore for determining directions by means of electric waves either a directive receiver was employed at the receiving station, or, when a simple receiving device was employed, signals were sent out from a directive, rotating transmitter, a predetermined signal being sent out for each direction. The first arrangement is of little use for practical purposes because it necessitates a complicated receiving apparatus on ships. It is true that the second arrangement has the advantage that a standard receiver can be employed, but it is necessary both to distinguish from one another the various kinds of signals given, *e. g.* those for the 32 points of the compass, and simultaneously to measure sound intensity.

A primary object of my invention is to very considerably simplify the last-named method, and to provide improved apparatus for reducing my simplified method to practice. To these ends, I arrange that at the sending station the beginning, for example, of the rotation of the sender from a predetermined direction is indicated by an undirected time-signal which is repeated at regular intervals of time. After the time signal one and the same directive signal can be given for all directions. At the receiving station only one measurement of sound intensity is then required, since the direction is obtained from the interval between the time-signal and the greatest or the least intensity of the sound. The arrangement is preferably such that at the moment the time-signal arrives at the receiving station a chronometer, *e. g.* a stop-watch, is started, whose hand directly indicates on a scale the synchronous direction of the sender. Whereas in arrangements known heretofore the various transmitting stations had to be distinguished by various waves or tones, and there was thus little possibility of distinguishing them, according to my invention the known method may be employed, according to which the transmitting stations can be distinguished from one another by each station being characterized by its time-signal. By this method when the position of two transmitting stations has been determined from the reading of the chronometer, the position of the receiving station is thereby obtained.

One preferred form of apparatus for reducing my improved method to practice is diagrammatically illustrated in the accompanying drawings, wherein:—

Figure 1 shows the manner in which the transmitter affects the receiver from a certain direction. Fig. 2 shows one form of the transmitting station.

Referring first to Fig. 1, A designates the transmitting station and B the receiving station. The rotating sender 3 at station A can be so arranged in known manner that several antennæ 2 disposed radially in the form of a star are excited one after another. At the receiving station B the numeral 14 denotes the double hand of a stop-watch 15 rotating synchronously with the sender, and 16 denotes the receiving antenna. Since the hand 14 rotates synchronously with the sender 3, the position of the hand at any time indicates which of the directive antennæ 2 is simultaneously excited. The maximum intensity of sound is obtained when the antenna 2 just connected into circuit is located in the direction of the receiver B. This condition is represented in the drawing.

Preferably the apparatus is so arranged that after the delivery of the time-signal, by which all the antennæ at the transmitting station A are uniformly excited, a directive signal is first sent in a northerly direction.

Referring now to Fig. 2, the numeral 1 designates the non-directive antenna and 2 the directive antennæ. The non-directive is an umbrella-shaped antenna, while the directive antennæ slope down as lineal extensions of the span wires 5. The central mast 6 accordingly serves as the common support both of the umbrella-shaped antenna 1, and of the directive antennæ 2, a specially advantageous construction of the entire antenna structure being thus obtained.

The apparatus for periodically connecting and disconnecting the various antennæ and for giving the signals comprises a rotating cross-bar 3 of insulating material carrying two contact pieces 4. When the bar 3 rotates, these contact pieces 4 come into contact with the contact pieces 7 one after another, the latter contact pieces corresponding in number with the directive antennæ and being mounted at the circumference of a stationary ring 8.

Connected to the rotating bar 3 are a contact-maker 9 (by gearing) so that it rotates synchronously therewith, and also the sending apparatus 20. Therefore when the bar 3, having the two connections to the sender, rotates, there come into operation first the non-directive antenna and then in regular succession the directive antennæ. For all the directive antennæ the signal sent out is the same. When, however, the non-directive or "time" antenna is switched into circuit, another signal, the code-signal of the station, is emitted.

I claim:—

1. A process of determining the compass direction of a given location by means of electromagnetic waves, consisting in emitting at the transmitting station first a non-directive signal, and then a directive signal rotating from a predetermined starting point on the compass in a predetermined direction and with a predetermined speed, and in determining at the place of observation the time-difference between the non-directive signal and the maximum or minimum intensity of radiant energy produced by the directive signal.

2. A process of determining the compass direction of a given location by means of electromagnetic waves, consisting in emitting at the transmitting station first a non-directive signal, and then a directive signal continuously rotating from a predetermined starting point on the compass in a predetermined direction and with a predetermined speed, and in determining at the place of observation the time-difference between the non-directive signal and the maximum or minimum intensity of radiant energy produced by the directive signal.

3. In apparatus for determining the compass direction of location of wireless telegraphic stations, the combination of a rotating sender, a non-directive antenna and a plurality of directive antennæ, means for coupling said sender to the antennæ so that first a non-directive signal is given and then a rotating directed signal, and means for determining at the receiving station the position of the plane of rotation of said directive signal.

4. In apparatus for determining the compass direction of location of wireless telegraphic stations, the combination of a rotating sender, a central undirected antenna and a plurality of directive antennæ arranged in a circle about the same, means for coupling said sender to the antennæ so that first a non-directive signal is given and then a rotating directive signal, and means for determining at the receiving station the position of the plane of rotation of said directive signal.

In testimony whereof, I affix my signature in the presence of two witnesses.

ALEXANDER MEISSNER.

Witnesses:
WOLDEMAR HAUPT,
HENRY HASPER.